US005775291A

United States Patent [19]

Choi

[11] Patent Number: 5,775,291

[45] Date of Patent: Jul. 7, 1998

[54] DIESEL ENGINE CONTROLLER

[75] Inventor: Nam-Yong Choi, Seoul, Rep. of Korea

[73] Assignee: Kia Motors Corporation, Seoul, Rep. of Korea

[21] Appl. No.: 629,707

[22] Filed: Apr. 9, 1996

[30] Foreign Application Priority Data

| | | | |
|---|---|---|---|
| Dec. 5, 1995 | [KR] | Rep. of Korea | 1995-46924 |
| Dec. 5, 1995 | [KR] | Rep. of Korea | 1995-46926 |
| Dec. 5, 1995 | [KR] | Rep. of Korea | 1995-46932 |
| Dec. 5, 1995 | [KR] | Rep. of Korea | 1995-46934 |
| Dec. 5, 1995 | [KR] | Rep. of Korea | 1995-46935 |

[51] Int. Cl.[6] .............. F02D 41/22; F02B 77/08; G06F 19/00

[52] U.S. Cl. .............. 123/339.15; 123/145 A; 123/198 D; 123/339.17; 123/501; 73/117.3; 701/114

[58] Field of Search .............. 123/179.17, 145 A, 123/179.6, 501, 502, 339.17, 339.15, 198 D; 62/133, 324.4; 73/117.2, 117.3; 364/431.11

[56] References Cited

U.S. PATENT DOCUMENTS

| | | | |
|---|---|---|---|
| 4,406,262 | 9/1983 | Ikeura | 123/339 |
| 4,556,942 | 12/1985 | Russo et al. | 364/431.07 |
| 4,639,871 | 1/1987 | Sakai et al. | 364/431.1 |
| 4,829,960 | 5/1989 | Yuzawa et al. | 123/339 |
| 4,883,034 | 11/1989 | Yashiki et al. | 123/339 |
| 5,146,900 | 9/1992 | Sekiya | 123/501 |
| 5,367,996 | 11/1994 | Homik et al. | 123/179.8 |
| 5,477,834 | 12/1995 | Yoshizu | 123/501 |
| 5,546,755 | 8/1996 | Krieger | 62/133 |

*Primary Examiner*—Willis R. Wolfe
*Assistant Examiner*—Hieu T. Vo

[57] ABSTRACT

A diesel engine controller for a car is disclosed including preheating determine means for determining according to data detected during starting whether a preheating device is driven; fuel injection time determining means for deciding a fuel injection time according to the detected data; air conditioner operation determining means for determining whether the engine is overloaded or not according to the data detected when the air conditioner switch operates; idling number determining means for during engine idling, determine whether the idling number is normal according to the detected data from the transmission lever position detecting sensor; self-diagnosing means for determining whether a trouble is caused according to the detected data; and an electronic control unit for controlling the output according to respective decision results.

10 Claims, 15 Drawing Sheets

DIESEL ENGINE CONTROLLER

BACKGROUND OF THE INVENTION

1. Field of the Invention

The present invention relates to a diesel engine controller for cars, and more particularly, to a diesel engine controller for extending control functions of the engine controller of a car, to thereby enhance the reliability of its output.

2. Description of the Prior Art

Generally, the diesel engine of a car is operated in such a manner which only air is sucked and compressed into the cylinder, light oil is injected into the cylinder under a high pressure when the temperature of the air is raised up to about 700° C., and thus the injected fuel is self-ignited and burned by the compressed heat of the air. The output of the diesel engine is controlled by the amount of fuel injection, and the engine's cycle is completed by four strokes of induction, compression, power and exhaust, that is, twice of the crankshaft. The diesel engine is raised to a high temperature by sucking and compressing only air.

A conventional controller for a car using the diesel engine determines the operation of its output means, depending upon the respective sensors or upon whether the electronic devices' operation switches are turned ON or OFF.

For the sensors which detect the state of the car's respective parts, there are provided an air flowmeter for detecting the amount of the air sucked into the engine, a throttle position sensor for detecting its idling state and load according to whether how much the throttle valve is opened, a cooling water temperature sensor for detecting the temperature of cooling water circulating the inside of the engine, a suction temperature sensor for detecting the temperature of the air sucked into the engine, resulting in increasing or reducing the amount of fuel injection according to the temperature of the sucked air, an engine revolution number sensor for detecting the injection timing and the number of revolution per minute of the engine according to a primary ignition signal, and a starting signal sensor for detecting whether the engine is in the starting mode or not. The controller controls the respective output means through detecting signals from said sensors.

Here, for one of the respective output means driven according to the control signal of the controller, there is given a preheating system for preheating air of the precombustion chamber to facilitate starting because when the outdoor temperature is low or the engine is frozen in the winter, the compressed heat of air is absorbed to the cylinder and cylinder head so that it does not rise up to a high temperature enough to ignite the fuel. To enhance the capability of starting, the conventional preheating system performs preheating control by a timer, and is controlled by the control unit of a quick start system (QSS). This control unit of the QSS consists of four timers, that is, a lamp timer for lighting the preheating lamp for five seconds when the ignition switch is ON, a preheat timer for making the glow relay conductive for about six or seven seconds in order to quickly preheat the glow plug when the ignition switch is ON, a chopping timer for turning ON/OFF the glow relay in order to maintain the preheating temperature of the glow plug when the ignition switch remains ON, and an afterglow timer for turning ON/OFF the glow relay for about fifteen seconds in order to perform quick warming up and reduce white smoke below 30° C. of cooling water temperature.

For other output means, there is provided a mechanical fuel injection system for performing feedback control by the throttle position sensor for detecting the degree of opening the accelerator pedal in order to reduce NOx and particulate matter (PM) at the same, and by the engine revolution number sensor.

For another output means, there are given an air conditioner for cooling the air of the car and preventing the windows from the frost, a mechanical solenoid valve for increasing the opening angle of the throttle valve in order to raise the engine revolution number to a target value, a lighting device for illuminating the car and informing other cars of the driving state of the car, and a carburetor operating by the difference of fuel supply time in accordance with the abrupt opening of the throttle valve. According to the sensors and switch, the controller applies a control signal to the respective output means, and thus controls the operation thereof.

However, the conventional engine controller of a car cannot output a control signal to enable its output means to be driven at the optimal condition, involving the following problems.

First of all, the conventional controller for controlling the preheating system applies the control signal to operate the preheating system when the temperature detected by the cooling water temperature sensor is not suitable for starting, so that the preheating system operates only for a time set by the timer of the control unit. Therefore, even without sufficient preheating, the preheating system stops after the time set by the timer. For this reason, it is difficult to promote normal driving.

The controller for controlling the mechanical fuel injection system is made to perform starting regardless of the theoretical air-to-fuel ratio and the ratio of fuel density according to the abrupt opening of the throttle valve, producing harmful gas such as CO, HC, $SO_2$ during imperfect combustion. In addition, with the conventional mechanical controller, precise control of fuel injection time is difficult to achieve, as well as the control of harmful gas and exhaust cause due to imperfect combustion.

The conventional air conditioner controller of a car performs cooling by the compressor of the air conditioner to which the power of the engine is transmitted. For this reason, when the air conditioner operates, the output of the engine transmitted to the car decreases. This overloads the engine when the car starts or is accelerated abruptly during its running while the air conditioner is ON.

Furthermore, the prior art does not have a device for informing the driver of troubles when the values detected from the respective sensors are above or below reference values. Therefore, the driver may be flurried because he does not know which part of the car is out of order. In case of severe trouble, the car may stop, causing serious accidents during running.

SUMMARY OF THE INVENTION

Therefore, it is an object of the present invention to provide a diesel engine controller for improving the cold starting of a car using a diesel engine, and appropriately controlling the temperature of air contained inside the combustion chamber even during the car's running to thereby reduce the amount of exhaust gas.

It is another object of the present invention to provide a diesel engine controller for enabling optimal fuel supply throughout the range of the engine's revolution.

It is still another object of the present invention to provide a diesel engine controller and controlling method for automatically turning ON/OFF the air conditioner, depending upon the degree of overload of the engine.

It is yet another object of the present invention to provide a diesel engine controller for stabilizing the number of the engine's idling.

It is still yet another object of the present invention to provide a diesel engine controller and controlling method for, if troubles happen in a car, informing the driver of the troubles caused, and guaranteeing a minimum of traveling capability with which the car can move to its maintenance location.

To accomplish the objects of the present invention, there is provided a first embodiment of the diesel engine controller of the present invention comprising a sensor for detecting the number of revolution of the engine; a throttle position sensor for detecting the position of a throttle valve to obtain the opening degree of the throttle valve; a cooling water temperature sensor for detecting the temperature of cooling water which reduces the temperature of an engine room; a starting switch operating as a starting key is turned ON/OFF; preheating determining means for, when said starting switch operates, determining whether to preheat the engine or not on basis of the number of engine revolution detected from said engine revolution number sensor, the opening degree of said throttle valve detected from said throttle position sensor, and the temperature of cooling water detected from said cooling water temperature sensor; and an electronic control unit for, if preheating is determined by the preheating determining means, outputting a control signal to drive a glow relay and preheating lamp until a normal number of engine revolution, normal amount of the throttle, and normal cooling water temperature.

There is further provided a second embodiment of the diesel engine controller comprising: an engine revolution number sensor for detecting the number of revolution of the engine; a throttle position sensor for detecting the position of a throttle valve to obtain the opening degree of said throttle valve; a cooling water temperature sensor for detecting the temperature of cooling water; fuel injection time determining means for comparatively determining an advanced angle injection or delayed angle injection on basis of the number of engine revolution detected from said engine revolution number sensor, the opening degree of said throttle valve detected from said throttle position sensor, and the temperature of cooling water detected from said cooling water temperature sensor; an electronic control unit for outputting a control signal according to the decision from said fuel injection time determining means; and a timer control valve controlled according to the control signal of said electronic control unit.

There is further provided a third embodiment of the diesel engine controller comprising: an engine revolution number sensor for detecting the number of revolution of the engine; a throttle position sensor for detecting the position of a throttle valve; a starting switch turning ON/OFF according to the starting state of a car; an air conditioner switch turning ON according to the operation of an air conditioner; air conditioner operation determining means for determining whether the engine is overloaded during starting or running according to the engine revolution number and the opening degree of the throttle valve respectively detected from said engine revolution number sensor and said throttle position sensor, and the operation of the starting switch; and an electronic control unit for, if it is determined by the air conditioner operation determining means whether the engine is overloaded during starting or running, outputting a control signal to turn OFF an air conditioner relay for a predetermined time according to the determination result.

There is provided a fourth embodiment of the diesel engine controller comprising: an engine revolution number sensor for detecting an engine revolution number of a car; cooling water temperature sensor for detecting the temperature of cooling water; a transmission lever position detecting sensor for detecting whether a gear is in a driving position or in the neutral position; an air conditioner switch turning ON as an air conditioner operates; idling number determining means for determine whether idling is for driving or engine warming up, and comparing the detected idling engine revolution number when the air conditioner is driven when the engine is warmed up with the stored ranges, wherein the stored ranges are the tgarget idling engine revolution number when the air conditioner is drive or when the warm up on basis of the position of the transmission lever detected from the transmission lever position detecting sensor, the engine revolution number, cooling water temperature, and the operation of the air conditioner switch; an electronic control unit for outputting a control signal when the idling number reaches a target value according to the result determined by the idling number determining means; an FICD solenoid valve operating the control signal of the electronic control unit; and an FICD actuator for controlling the opening degree of the throttle valve according to the operation of the FICD solenoid valve.

There is further provided a fifth embodiment of the diesel engine controller comprising: an engine revolution number sensor for detecting an engine revolution number of a car; a throttle position sensor for detecting the position of a throttle valve, and detecting the flow of a mixer; a cooling water temperature sensor for detecting the temperature of cooling water circulating an engine room in order to prevent the engine from being overheated; a glow relay operating as a preheating switch operates; self-diagnosing means for determine whether there is caused a trouble by comparing the detected engine revolution number, the opening degree of the throttle valve and the temperature of cooling water while the glow relay operates, with those when the car is in its normal state; an electronic control unit for, if there is caused a trouble, outputting an engine revolution number, the opening degree of the throttle valve, and the temperature of cooling water to said self-diagnosing means, and outputting a control signal; and fail-safe output means operating according to the control signal output from said electronic control unit.

There is further provided a sixth embodiment of the diesel engine controller comprising: an engine revolution number sensor for detecting an engine revolution number of a car; a throttle position sensor for detecting the position of a throttle valve; a cooling water temperature sensor for detecting the temperature of cooling water; a transmission lever position detecting sensor for detecting the state of a gear; a preheating switch turned ON as a preheating device operates; a starting switch turned ON according to whether the car is starting or not; preheating determine means for determining according to data detected during starting whether the preheating device is driven; fuel injection time determining means for deciding a fuel injection time according to the detected data; air conditioner operation determining means for deciding whether the engine is overloaded or not according to the data detected when the air conditioner switch operates; idling number determining means for during engine idling, determine whether the idling number is normal according to the detected data from said transmission lever position detecting sensor; self-diagnosing means for determining whether a trouble is caused according to the detected data; and an electronic control unit for receiving a signal of said preheating determining portion, a signal of said fuel injection time determining portion, a signal of said air conditioner operation determining portion, a signal of said idling number determining portion, a signal of said self-diagnosing portion, said unit outputting a control signal to a glow relay and preheating lamp when preheating is determined, outputting a control signal to a timer control valve when fuel injection is determined, outputting a control signal to an air conditioner relay when the air conditioner is determined to operate, outputting a control signal to the FICD solenoid valve when idling number is determined, and outputting a control signal to said fail-safe output means when said self-diagnosing means determines that there is caused a trouble.

BRIEF DESCRIPTION OF THE ATTACHED DRAWINGS

DETAILED DESCRIPTION OF PREFERRED EMBODIMENT

Hereinafter, preferred embodiments of the present invention will be described in detail with reference to the attached drawings.

[Embodiment 1]

Figure 1A:
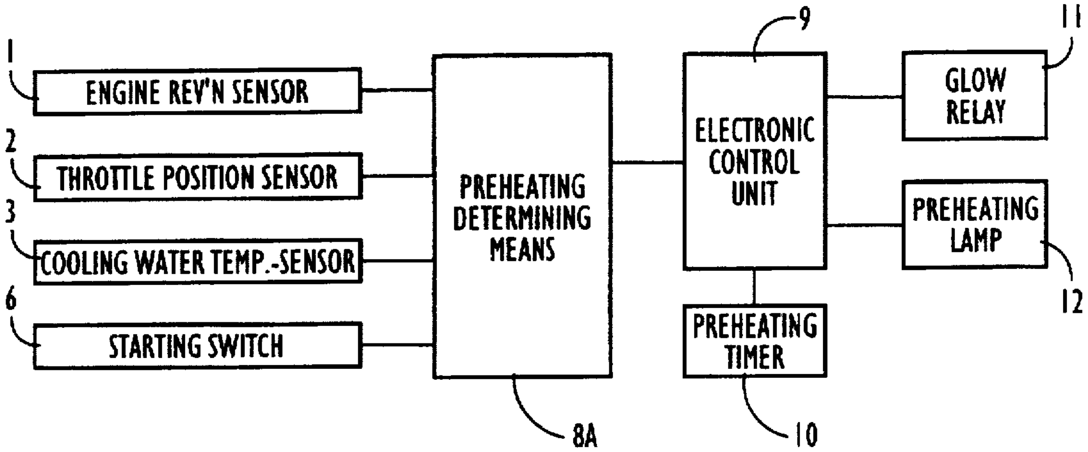
FIG. 1A is a block diagram of a preheating controller for a car according to the present invention.
Figure 1B:
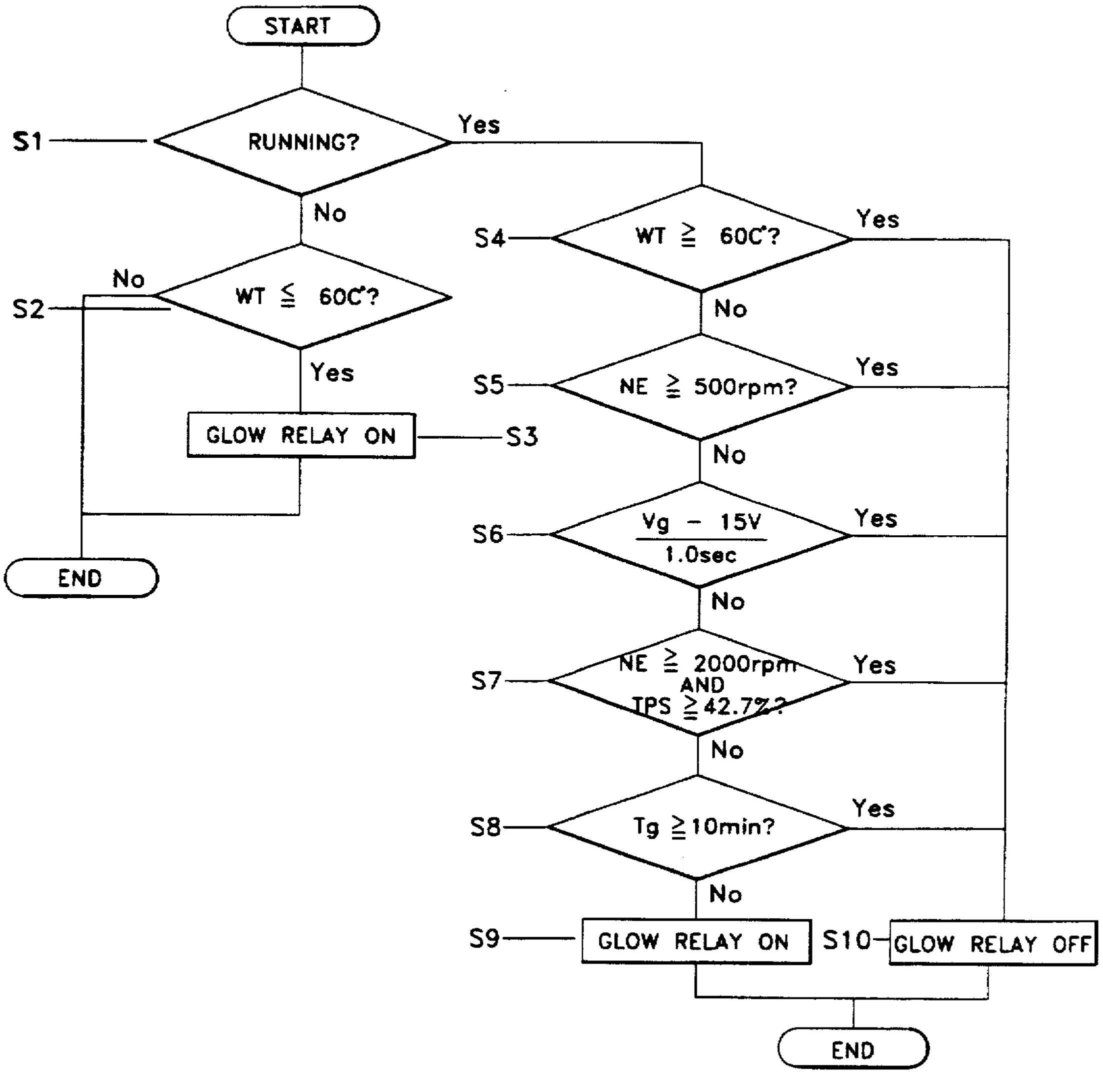
FIG. 1B is a flow chart illustrating a method for controlling the preheating controller in accordance with the present invention shown in FIG. 1A.

Referring to FIG. 1A, a preheating controller of the present invention comprises a engine revolution number sensor 1 for detecting the number of revolution of the engine for a car, a throttle position sensor 2 for detecting the position of a throttle valve to thereby obtain the opening degree of the throttle valve, a co oling water temperature sensor 3 for detecting the temperature of cooling heater, and a starting switch 6 operating as the starting key is turned ON.

When the car starts, the number of engine revolutions (NE) detected from the engine revolution number sensor 1, the opening degree of the throttle position sens or 2, and the temperature detected from the cooling water temperature sensor 3 are input to a preheating determin ing means 8A for determining the preheating state by comparing the temperature of cooling water and the number of engine revolution (NE) detected respectively from the sensors 1, 2 with a temperature and revolution number of when the engine is on the normal state.

The data determined by the preheating determining means 8A is input to electronic control unit 97 which outputs a control signal to a glow relay 11 and a preheating lamp 12 of the meter set according to the signal determined by the preheating determining means 8A and the time set by a preheating timer 10.

A method for controlling the preheating controller of the present invention will be explained below with reference to FIG. 13.

First of all, step S1 determines whether the car runs or not. If the car does not run in step S1, preheating is for improving cold starting. If the car runs, preheating is for the reduction of exhaust and for warming up.

If the car is running, step S2 determines whether the temperature detected from the cooling water temperature sensor is above a value suitable for starting, for instance, 60° C. If the temperature WT of cooling water is below 60° C. in step S2, the glow relay is driven in step S3 for a maximum of ten minutes by the timer 10 included in the electronic control unit for the purpose of rapid warming up and reduction of white smoke. If the temperature WT of cooling water is above 60° C., the glow relay stops.

Here, if the glow relay 11 is driven, currents flow through a preheating plug (not shown) connected thereto, and thus the preheating plug emits heat to preheat the combustion chamber. Preheating device is driven by the control signal of electronic control unit 9.

If the car is not running in step S1, step S4 detects the temperature of cooling water, and determines whether the detected temperature WT of cooling water is above a predetermined value, preferably, 60° C. If so, step S10 turns OFF the operation of the glow relay, and if not, step S5 determines whether the number NE of engine revolution is below a predetermined value, for instance, 500 rpm.

If the number NE of engine revolution is below 5OOrpm, the operation of the glow relay is turned OFF in step S10. If not, step S6 determines whether to maintain, over one second, a state in which the voltage Vg of the preheating plug is above 15V.

If so in step S6, the glow relay is turned OFF in step S10, and if not, the preheating determining means 8A of this embodiment determines in step S7 whether the number NE of engine revolution is above 2,000 rpm, and the opening degree of the throttle valve is above a predetermined value, for instance, 42.7%.

If the number NE of engine revolution is above 2,000 rpm, and the opening degree of the throttle valve is above a predetermined value, for instance, 42.7% in step S7, step S10 turns OFF the glow relay. If not, step S8 determines whether the time Tg of the preheating timer 10 of the electronic control unit 9 passes over ten minutes.

If so in step S8, step S10 turns OFF the glow relay 11. If not, step S9 operates the glow relay 11. If the glow relay 11 operates, it makes current flow through the preheating plug in order to preheat the air of the combustion chamber. After this operation, the glow relay 11 stops.

By differentiating the operation time of the preheating plug in accordance with temperatures of cooling water, cold starting is improved, and the temperature of the air of the combustion chamber is appropriately controlled even during the car's running, to thereby reduce the amount of exhaust.

[Embodiment 2]

Figure 2A:
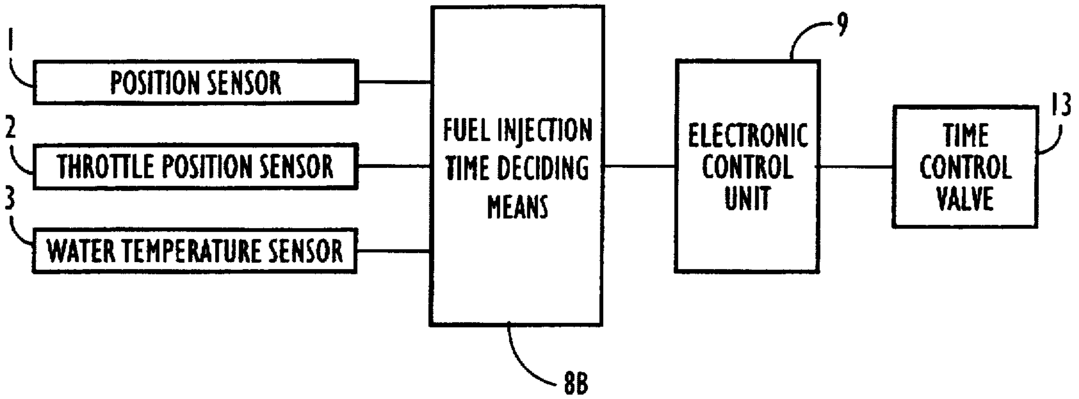
FIG. 2A is a schematic block diagram of an electronic fuel injection controller of a car according to the present invention.
Figure 2B:
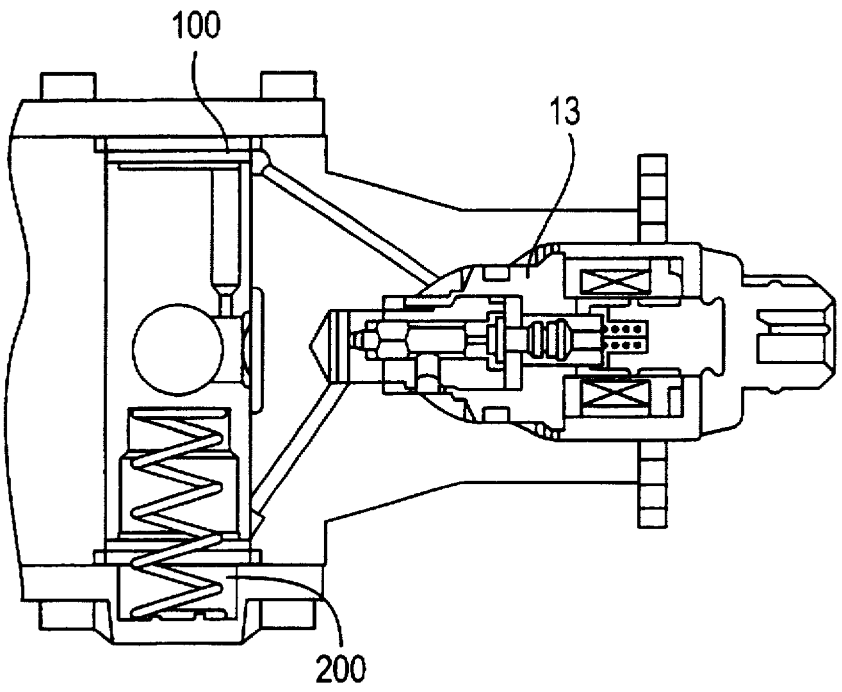
FIG. 2B is a sectional view of the electronic fuel injection controller of the present invention shown in FIG. 2A.
Figure 3A:
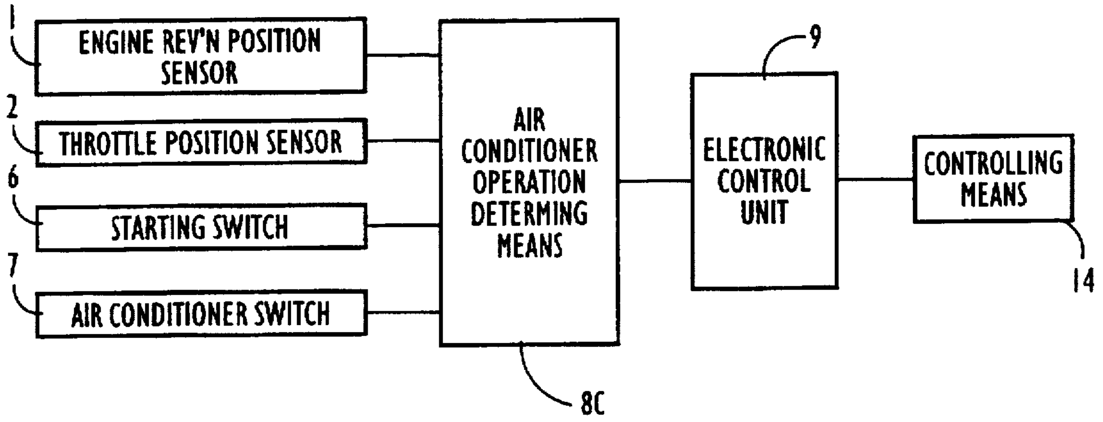
FIG. 3A is a schematic block diagram of the controller of an air conditioner of a car according to the present invention.

Referring to FIG. 2A, an electronic fuel injection controller of the present invention comprises a sensor 1 for detecting the number NE of engine revolution of a car, a throttle position sensor 2 for detecting the opening degree according to the position of the throttle valve, and a cooling water temperature sensor 3 for detecting the temperature of cooling water. The number NE of engine revolution, the opening degree of the throttle valve, and cooling water temperature WT detected from those sensors are input to fuel injection time deciding means 8B. The fuel injection time determining means 8B compares and determines the number NE of engine revolution, the opening degree of the throttle valve, and cooling water temperature WT, with a reference value corresponding to an optimal fuel injection time. Then, a fuel injection time determining signal is applied to a electronic control unit 9. The electronic control unit 9 applies a control signal to a timer control valve 13 for controlling the fuel injection time, on basis of the signal applied from the fuel injection time determining means 8B. The timer control valve 13 is positioned between a high pressure chamber 100 and low pressure chamber 200 of the fuel injection mechanism, as shown in FIG. 3A, and controls the pressure by bypassing the pressure of the high pressure chamber to the low pressure chamber. The timer control valve 13 enables the target injection time of the engine control unit to be controlled in a DUTY (20–100 Hz) control mode. Here, data map for deciding optimal injection time is illustrated in the table 1, with the data detected by the engine revolution number sensor 1, throttle position sensor 2, and cooling water temperature sensor 6. In the table 1, the hatched portions are delayed angle injection areas where the timer control valve is OFF, the blank portions being advanced angle injection areas where the timer control valve is ON.

In other words, when the detected value is positioned in the hatched portions in the data map, the fuel injection time determining means 8B turns the timer control valve 13 on and controls for the fuel injection to be the optimal state by bypassing the pressure of the high pressure chamber to the low pressure chamber if the temperature of cooling water is above a predetermined value, for instance, 60° C. The method for controlling the electronic fuel injection time of a car will be described below.

Figure 2C:
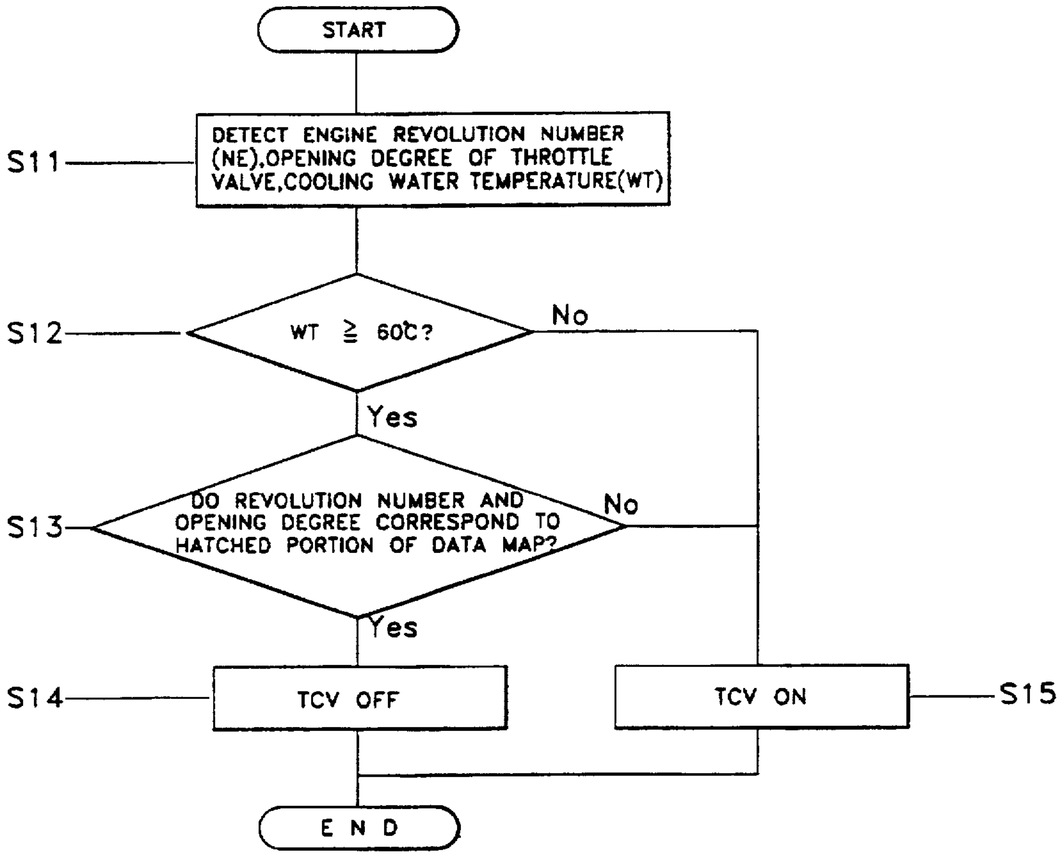
FIG. 2C is a flow chart of illustrating a method for controlling the electronic fuel injection controller of the present invention shown in FIG. 2A.

As shown in FIG. 2C, data detected from the respective sensors are input to the the fuel injection time determining means 8B performing the following operation. First, step S11 detects the number of engine revolution, the opening degree of the throttle valve, and cooling water temperature WT from the engine revolution number sensor 1, throttle position sensor 2, and cooling water temperature sensor 3.

TABLE 1

| opening degree | Revolutions per minute (rpm) | | | | | | | | | | | | | | | |
|---|---|---|---|---|---|---|---|---|---|---|---|---|---|---|---|---|
| (%) throttle valve | 5100 | 4740 | 4240 | 3800 | 3500 | 3180 | 2750 | 2380 | 2120 | 1880 | 1620 | 1380 | 1120 | 880 | 380 | 0 |
| 100 | | | | | | | | | | | | | | | | |
| 84.0 | | | | | | | | | | | | | | | | |
| 65.2 | | | | | | | | | | | | | | | | |
| 62.2 | | | | | | | | | | | | | | | | |
| 59.2 | | | | | | //// | //// | //// | | | | | | | | |
| 55.8 | | | | | | //// | //// | //// | //// | | | | | | | |
| 53.2 | | | | | | //// | //// | //// | //// | //// | | | | | | |
| 50.4 | | | | | | //// | //// | //// | //// | //// | //// | | | | | |
| 47.6 | | | | | | //// | //// | //// | //// | //// | //// | //// | | | | |
| 44.6 | | | | | | //// | //// | //// | //// | //// | //// | //// | | | | |
| 41.6 | | | | | | //// | //// | //// | //// | //// | //// | //// | | | | |
| 38.6 | | | | | | //// | //// | //// | //// | //// | | //// | | | /// | |
| 34.4 | | | | | | //// | //// | //// | //// | //// | | | | | /// | |
| 28.0 | | | | | | //// | //// | //// | //// | //// | | | | | /// | |
| 25.6 | | | | | | //// | //// | //// | //// | //// | | | | | /// | |
| 0.0 | | | | | | //// | //// | //// | //// | //// | | | | | ///0 | |

Step S12 determines whether the temperature of cooling water is above 60° C. If so, step S13 determines whether the number of engine revolution and the opening degree of the throttle valve correspond to the hatched portions in the table 1. If not, the timer control valve 13 operates in step S14. Here, operating the timer control valve 13 is designed to advance the fuel injection time. After that, if the detected engine revolution number NE and the opening degree of the throttle valve correspond to hatched portions of the data map in step S13, the timer control valve 13 is OFF in step S14, and if not, the timer control valve 13 operates in step S15. As stated above, the timer control valve 13 is controlled according to the engine revolution number NE, the opening degree of the throttle valve, and cooling water temperature, enabling optimal fuel supply throughout the rotation range of the engine.

[Embodiment 3]

Referring to FIG. 3A, a diesel engine controller of the present invention comprises an engine revolution number sensor 1 placed in the injector pump of the engine for detecting the engine revolution number NE, a throttle position sensor 2 for detecting the position of the throttle valve, and an air conditioner switch 7 turning ON according to the operation of the air conditioner. In addition, there is provided an air conditioner operation determining means 8C for determining whether the engine is overloaded or not according to engine revolution number NE, the opening degree of the throttle valve, and the operation of the air conditioner switch. If it is determined by air conditioner operation determining means 8C that the engine is overloaded, this determine signal is applied to electronic control unit 9, which has an air conditioner relay 14.

Figure 3B:
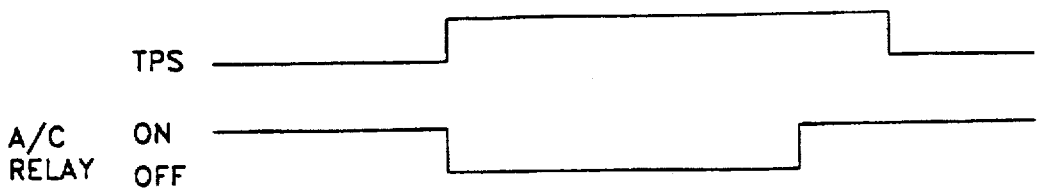
FIGS. 3B, 3C and 3D are timing diagrams illustrating a method for controlling the air conditioner controller of the present invention shown in FIG. 3A.
Figure 3C:
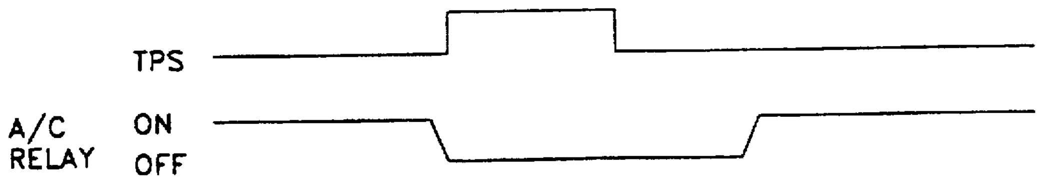
Figure 3D:
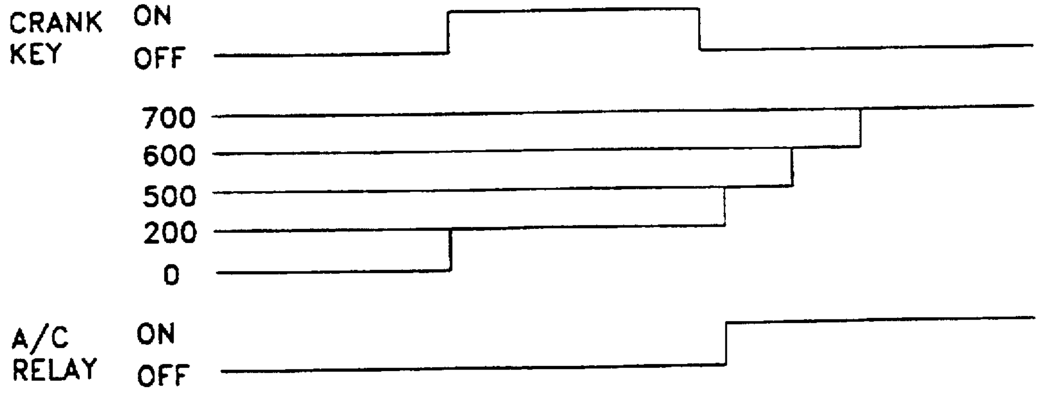

Here, air conditioner operation determining means 8C determines the operation of the air conditioner relay according to the air conditioner switch 7, the opening degree of the throttle valve, and engine revolution number NE. More specifically, if the air conditioner switch 7 is turned on, the opening degree detected from the throttle position sensor 2 is above ⅞, and this state is maintained over ten seconds, the air conditioner relay is turned off for a maximum of ten seconds, preferably, for thirteen seconds in consideration of delay time, as shown in FIG. 3B, at the same when the opening degree detected from the throttle position detection sensor becomes ⅞. If the opening degree detected from the throttle position detection sensor is above ⅞, and this state is maintained below ten seconds while the air conditioner operates, the air conditioner relay 14 is turned OFF for about seven seconds, preferably, for ten seconds in consideration of delay time, as shown in FIG. 3C, starting from when the opening degree detected from the throttle position detection sensor becomes ⅞. After the starting key is turned ON, and as engine revolution number NE increases generally to 200, 500, 600, or 700 rpm, air conditioner operation determining means 8C outputs a signal for turning the air conditioner relay 14 off till the number of revolution becomes 500 rpm and for turning the air conditioner relay on till the number of revolution becomes over 500 rpm to the electronic control unit, as shown in FIG. 3D.

Figure 3E:
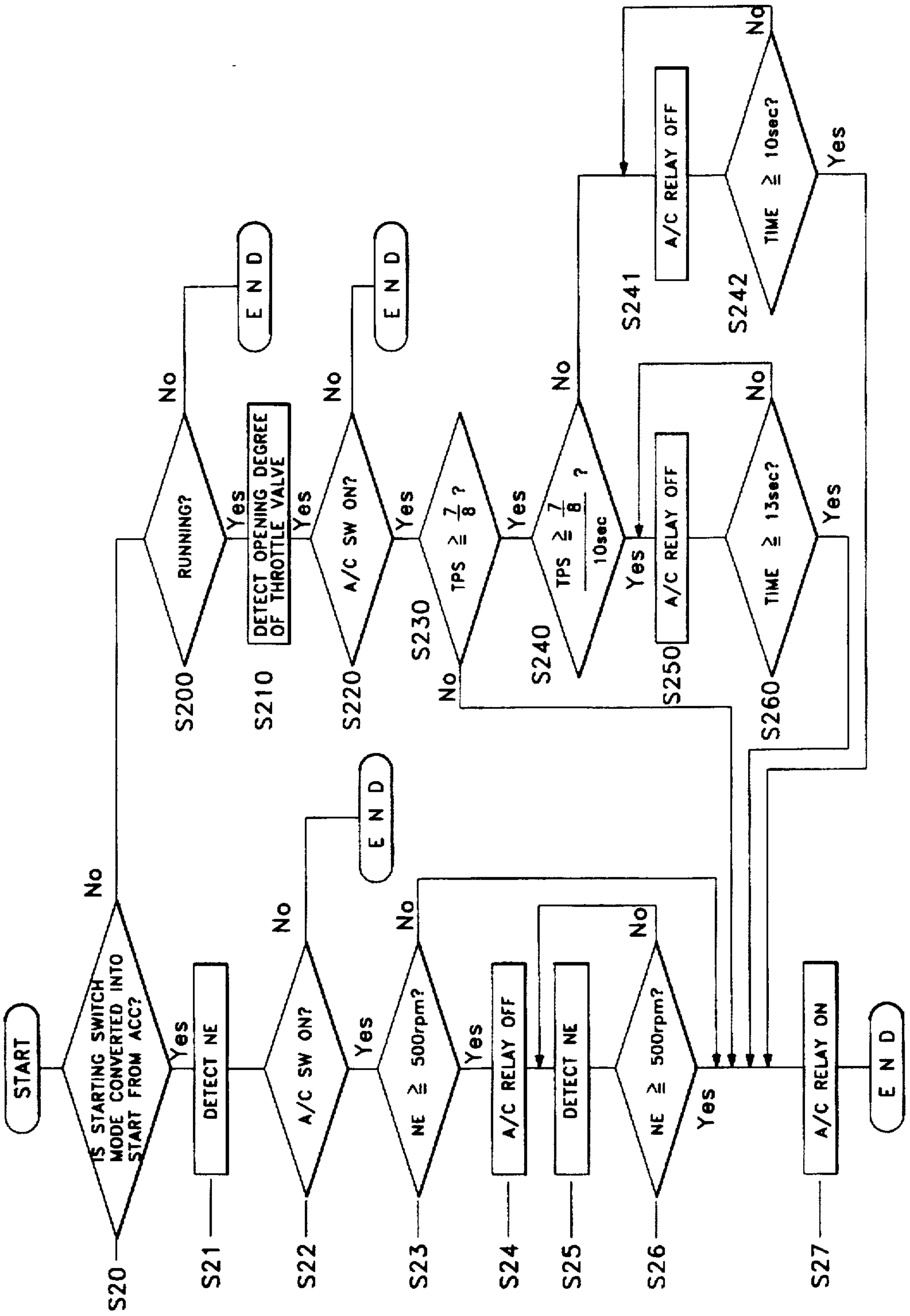
FIG. 3E is a flow chart illustrating the method for controlling the air conditioner controller of the present invention shown in FIG. 3A.

A method for controlling the air conditioner controller of the present invention will be explained in detail with reference to FIG. 3E. Referring to FIG. 3E, step S20 determines whether the car is starting, in other words, the starting mode is changing from ACC mode to START mode. If so, step S21 detects engine revolution number NE from engine revolution number sensor 1. Step S22 determines whether the air conditioner is turned on. If the air conditioner switch is turned on in step S22, step S23 determines whether the engine revolution number NE detected in step S21 is below 5OOrpm. If not, the air conditioner operating determining means 8C the air conditioner controller of the present invention stops the operation. If the engine revolution number NE is not below 500 rpm in step S23, step S24 turns OFF air conditioner relay 14. Sequentially, step S25 detects the engine revolution number NE from engine revolution number sensor 1. Then, the air conditioner relay 14 is turned off, and it is determined in step S26 whether the detected engine revolution number NE is above 500 rpm. If so, air conditioner relay 14 is made to operate, and if not, step S26 returns to step S25.

If the starting mode is not changing from the ACC mode to START mode in step S20, step S200 decides whether the car is running or not. If so, step S210 detects the opening degree of the throttle valve by throttle position sensor 2, and if not, it is determined that the starting key is OFF to stop the air conditioner operating determining means 8C of the present invention. If the opening degree of the throttle valve is detected in step S210, step S220 decides whether the air conditioner switch is turned on. If so, step S230 determines whether the detected opening degree of the throttle valve is over ⅞, and if not, it is determined that the air conditioner does not operate during running, to stop the air conditioner operating determining means 8C of the present invention. If the detected opening degree of the throttle valve becomes ⅞, step S240 determines whether over ⅞ of the whole opening amount is maintained over ten seconds. If not, step S270 continuously operates the air conditioner relay 14.

If over ⅞ of the whole opening amount is maintained over ten seconds in step S240, it is determined that the engine is overloaded, and the air conditioner relay 14 is turned off in step S250. After the air conditioner relay is off, step S260 decides whether the time to turn off the air conditioner relay 14 passes over thirteen seconds. If over thirteen seconds pass after the air conditioner relay 14 is turned off in step S260, step S270 turns on the air conditioner relay 14. If not, this step goes to step S250.

If over ⅞ of the whole opening amount is not maintained over ten seconds in step S240, it is determined that the engine is overloaded, and the air conditioner relay 14 becomes off in step S241. Step S242 determines whether over ten seconds pass after the air conditioner relay is turned OFF. If over ten seconds pass after the air conditioner relay 14 is turned off in step S242, step S27 turns on the air conditioner relay, and if not, this step returns to step S241.

As described above, in this embodiment, when the engine is overloaded, the air conditioner relay is turned off automatically according to the engine revolution number and the opening degree of the throttle valve, preventing the overload of the engine.

[Embodiment 4]

Figure 4A:
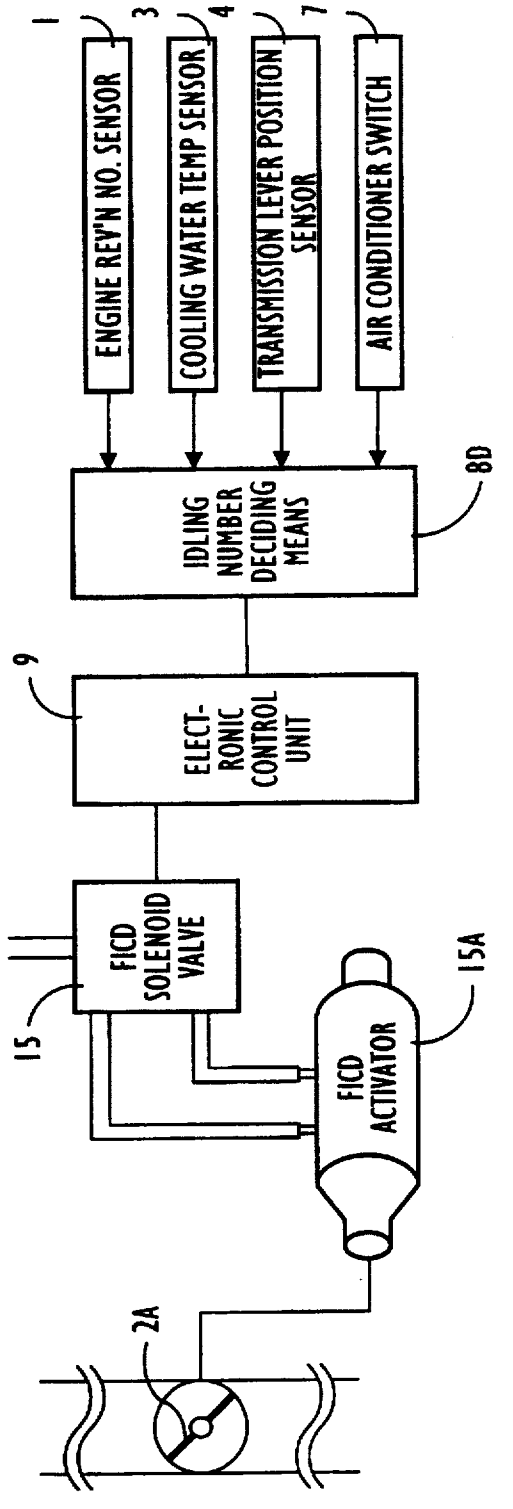
FIG. 4A is a schematic block diagram of an idling number controller for a car according to the present invention.

Referring to FIG. 4A, an idling number controller of the present invention comprises an engine revolution number sensor 1 for detecting the engine revolution number NE, cooling water temperature sensor 3 for detecting the temperature of cooling water, a transmission lever position detecting sensor 4 for detecting whether the gear is in a driving position or in the neural position, and air conditioner switch 7 turning ON/OFF as the air conditioner operates. The position of the transmission lever detected from the transmission lever position detecting sensor, engine revolution number NE, cooling water temperature WT, and the state of the air conditioner switch are input to idling number determining means 8D. On basis of the input data, idling number determining means 8D determines whether the idling is for driving the air conditioner or for warming up of the engine, and compares target idling engine revolution number NE during the driving of the air conditioner with that during the warming up of the engine. The result of the idling revolution number is input to electronic control unit 9, which applies a control signal to FICD solenoid valve 15 until target revolution numbers arrive for the respective idling states. FICD solenoid valve 15 operates by the control signal of the electronic control unit so that FICD actuator 15A controls the opening degree of throttle valve 2A. Here, the operation principle of cooling water temperature sensor 3, transmission lever position detecting sensor 4, and FICD solenoid valve 15 operating according to the state of the air conditioner switch are shown in the table 2.

| Water Temperature | Air Conditioner Switch | FICD Solenoid Valve | Target Idling Revolution Number |
|---|---|---|---|
| WT < 20° C. | | ON | A rpm |
| 20° C. < WT < 60° C. | | ON | B rpm |

-continued

| Water Temperature | Air Conditioner Switch | FICD Solenoid Valve | Target Idling Revolution Number |
|---|---|---|---|
| WT > 60° C. | | OFF | C rpm |
| | OFF | OFF | C rpm |
| | ON | ON | B rpm |

In the table 2, if the temperature of cooling water is below 20° C. when the car is warmed up, the control signal is applied to operate the FICD solenoid valve 15, and the opening degree of the throttle valve is controlled by the FICD actuator 15A increasing the idling number to the target value. Even when the car is overloaded due to the driving of the air conditioner, and thus the idling revolution number is below a reference value, the control signal is applied to drive the FICD solenoid so that the opening degree of the throttle valve is controlled. This increases the idling number to a target value.

The operation of the idling number controller of the present invention will be described below with reference to FIGS. 4B and 4C. The operation of the idling number controller of this embodiment will be explained by dividing it into methods for controlling the idling revolution number in accordance with the temperature of cooling water during starting and during staring mode conversion.

Figure 4B:
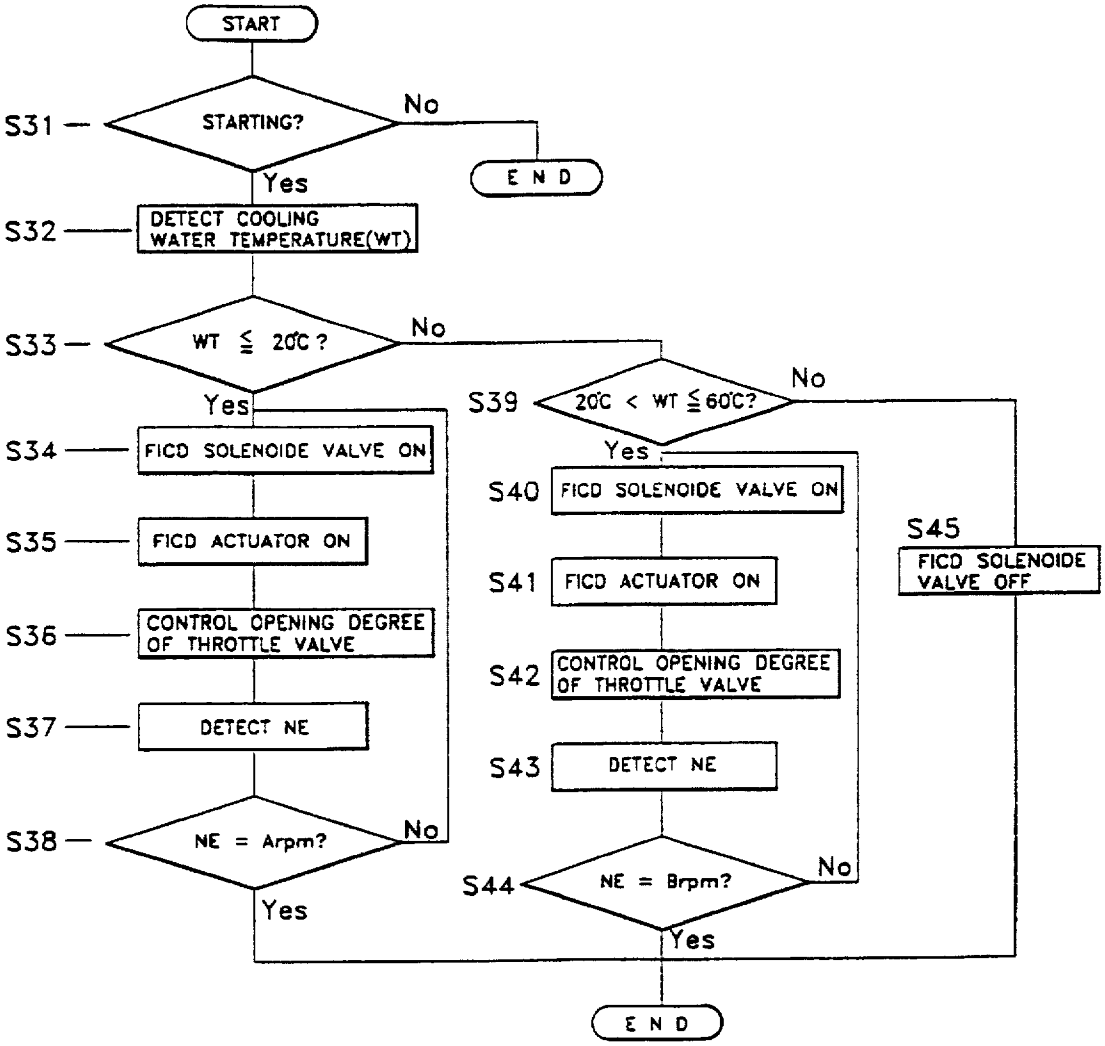
FIG. 4B is a flow chart of illustrating a method for controlling the idling number controller shown in FIG. 4A.

First of all, as shown in FIG. 4B, in the method for controlling the idling number in accordance with cooling water during starting, step S31 determines whether the car is starting or not. If in the starting mode in step S31, step S32 detects the temperature of cooling water from cooling water temperature sensor 3, and if not, the engine revolution determining means stops during idling. Step S33 determines whether the detected cooling water temperature WT is below 20° C. If the cooling water temperature WT is below 20° C. in step S33, the FICD solenoid valve 15 operates in step S34 so that the FICD 15A actuator is driven in step S35. Therefore, step S36 controls the throttle valve to have a target revolution number. In step S37, the idling number of the engine is detected, and in step S38 the detected idling number is compared with the target idling revolution number A rpm. If the detected idling revolution number is the same as the target idling number, the controller of the present invention stops, and if not, this step returns to step S34.

If the temperature of cooling water is not smaller than 20° C. in step S33, step S39 determines whether the detected temperature of cooling water is greater than 20° C. but smaller than 60° C. If so, step S40 operates the FICD solenoid valve 15, and step 41 operates the FICD actuator 15A. Therefore, in step S42, the opening degree of the throttle valve is controlled to have a predetermined number of revolution. Then, the idling number of the engine is detected in step S43, and compared with the target idling number B rpm in step S44. If they are the same in step S44, the idling number determining means 8D of the present invention stops, and if not, the step goes to step S40. If the temperature of cooling water is greater than 20° C. and not smaller than 60° C. in step S39, the FICD solenoid valve 15 stops in step S45, finishing the idling number determining means 8D of the present invention.

Figure 4C:
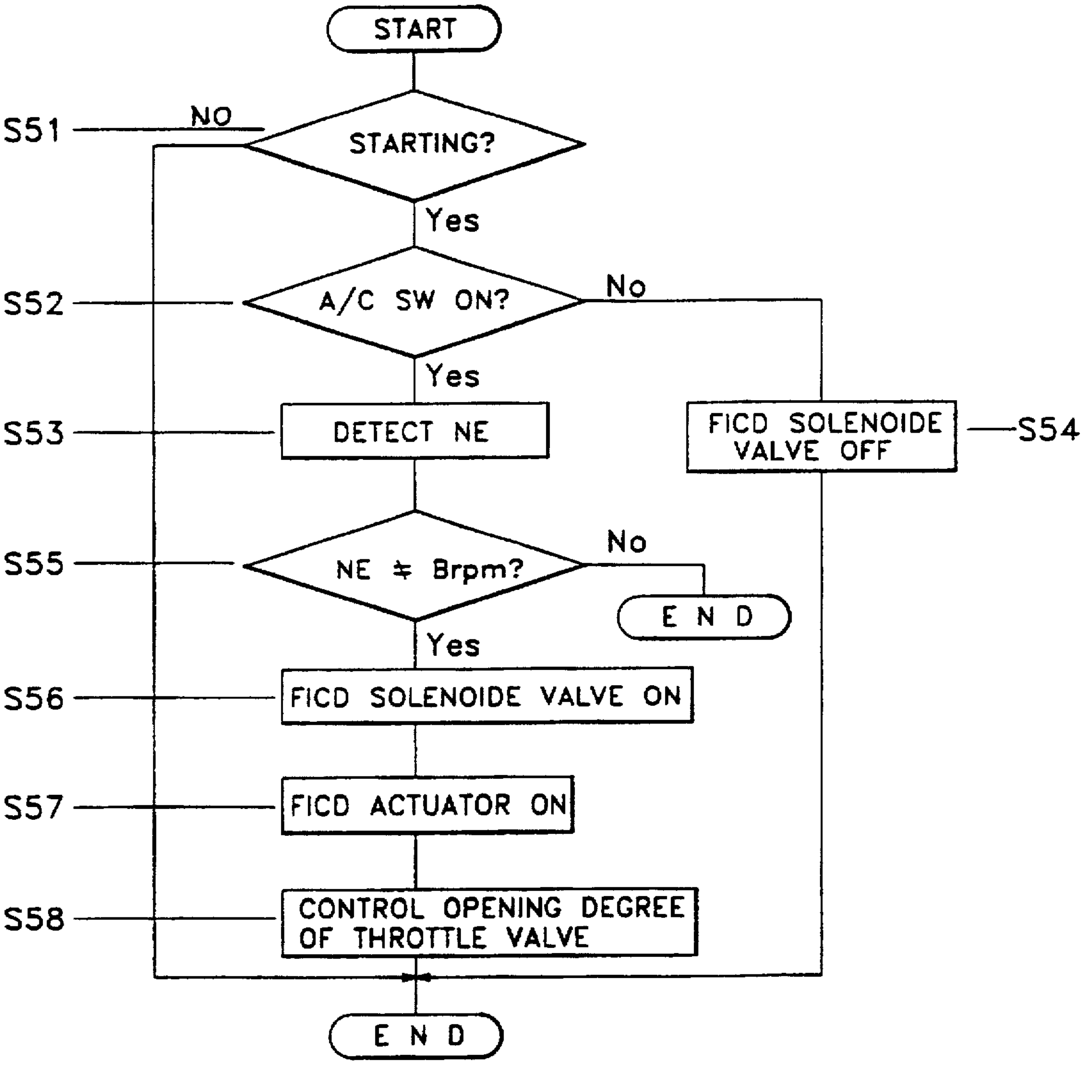
FIG. 4C is a flow chart of illustrating a method for controlling the idling number controller shown in FIG. 4A during running.

In the method for controlling the idling number during running, step S51 determines whether the car is starting or not, as shown in FIG. 4C. If the car is starting in step S51, step S52 decides whether the air conditioner switch operates, and then stops the idling number determining means 8D of the present invention. If the air conditioner switch operates in step S52, step S53 detects the idling number of the engine from the idling number sensor, and if not, step S54 stops the FICD solenoid valve 15 and the idling number determining means 8D

Step S55 determines whether the detected idling number is the same as the target idling number B rpm. If the idling number is the same as the target idling number, step S55 stops the FICD solenoid valve 15 and the idling number determining means 8D of the present invention. If not in step S55, the FICD solenoid valve 15 operates in step S56 to have the target idling number. Accordingly, the FICD actuator 15A operates in step S57, and the opening degree of the throttle valve is controlled to have a predetermined revolution number in step S58. Thereafter, the idling number controller of the present invention stops.

In this embodiment, a stable idling number of the engine is obtained by controlling the position of the throttle valve with the FICD actuator operating according to the FICD solenoid valve.

[Embodiment 5]

Figure 5A:
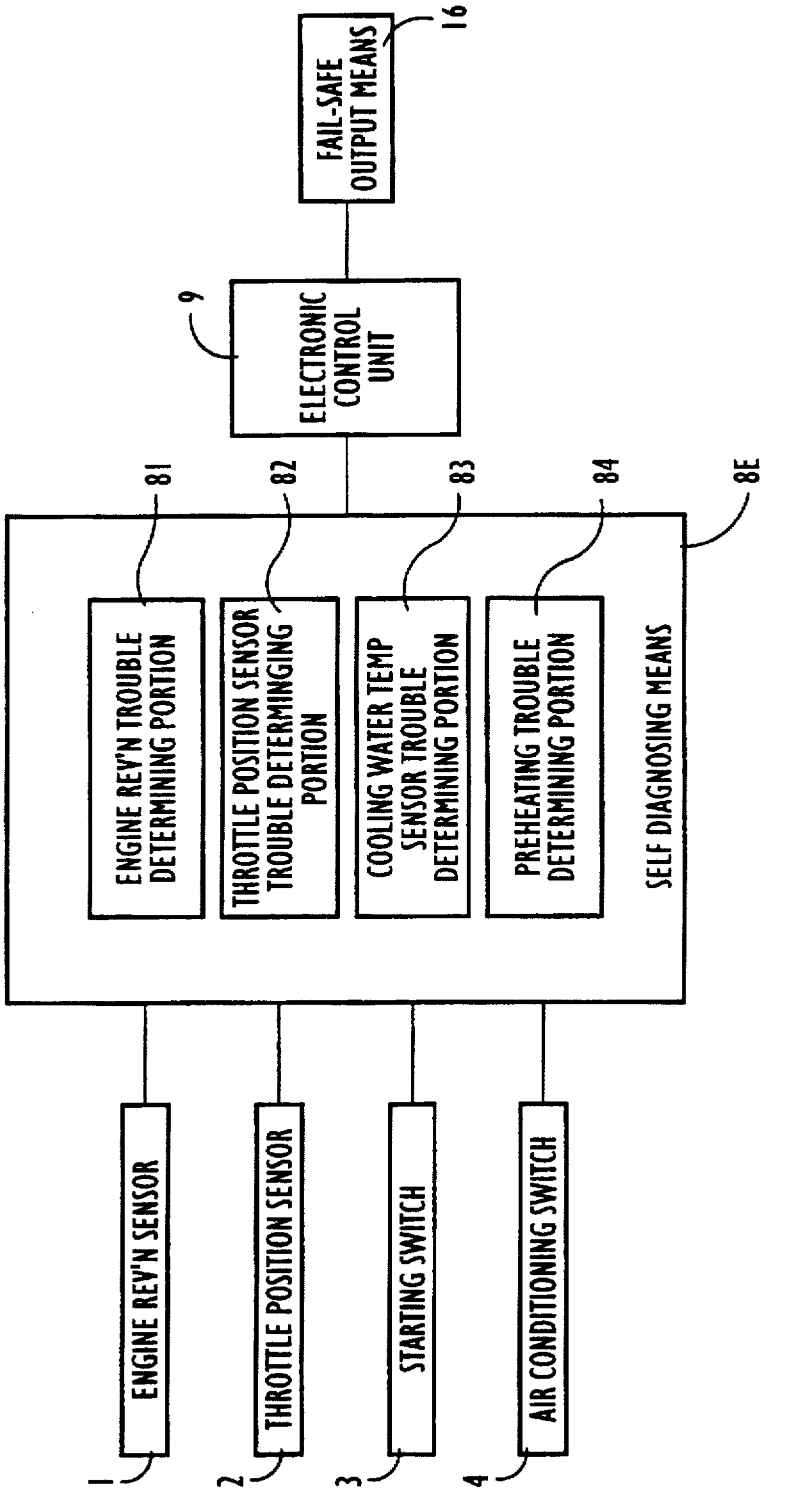
FIG. 5A is a schematic block diagram of a self-diagnosing and fail-safe controller according to the present invention.

Referring to FIG. 5A, a self-diagnosing/fail-safe controller comprises an engine revolution sensor 1 for detecting the engine revolution number NE of a car, a throttle position sensor 2 for detecting the flow of the mixer in order to find out the position of the throttle valve, a cooling water temperature sensor 3 for detecting the temperature of cooling water circulating the engine room in order to prevent the engine from being overheated, and a glow relay 4 operating according to the preheating state of the car.

The respective states of the car are detected by engine revolution sensor 1, throttle position sensor 2, cooling water temperature sensor 3, and glow relay 4, and the detected data are input to self-diagnosing means 8E. Self-diagnosing means 8E judges whether the detected data coincide with the engine revolution number, the opening degree of the throttle valve, and the temperature of cooling water. Self-diagnosing 8E includes an engine revolution trouble determining portion 81 for deciding the trouble of engine revolution number sensor, a throttle position sensor trouble determining portion 82 for determining the trouble of the throttle position sensor, a cooling water temperature sensor trouble determining portion 83 for deciding the trouble of the cooling water temperature sensor, and a preheating trouble determining portion 84 for deciding the trouble or shorting of the glow relay. These portions judge respective troubles. When the self-diagnosing means 8E judges troubles, the judgement result is input to electronic control unit 9. Electronic control unit 9 applies a control signal so that an engine revolution number NE, the opening degree of the throttle valve, and cooling water temperature WT are output to selfdiagnosing means 8E in order to provide a minimum of the car's running capability, and operates fail-safe output means 16 for indicating troubles to the driver. The output means is a lamp placed in the meter set.

Figure 5B:
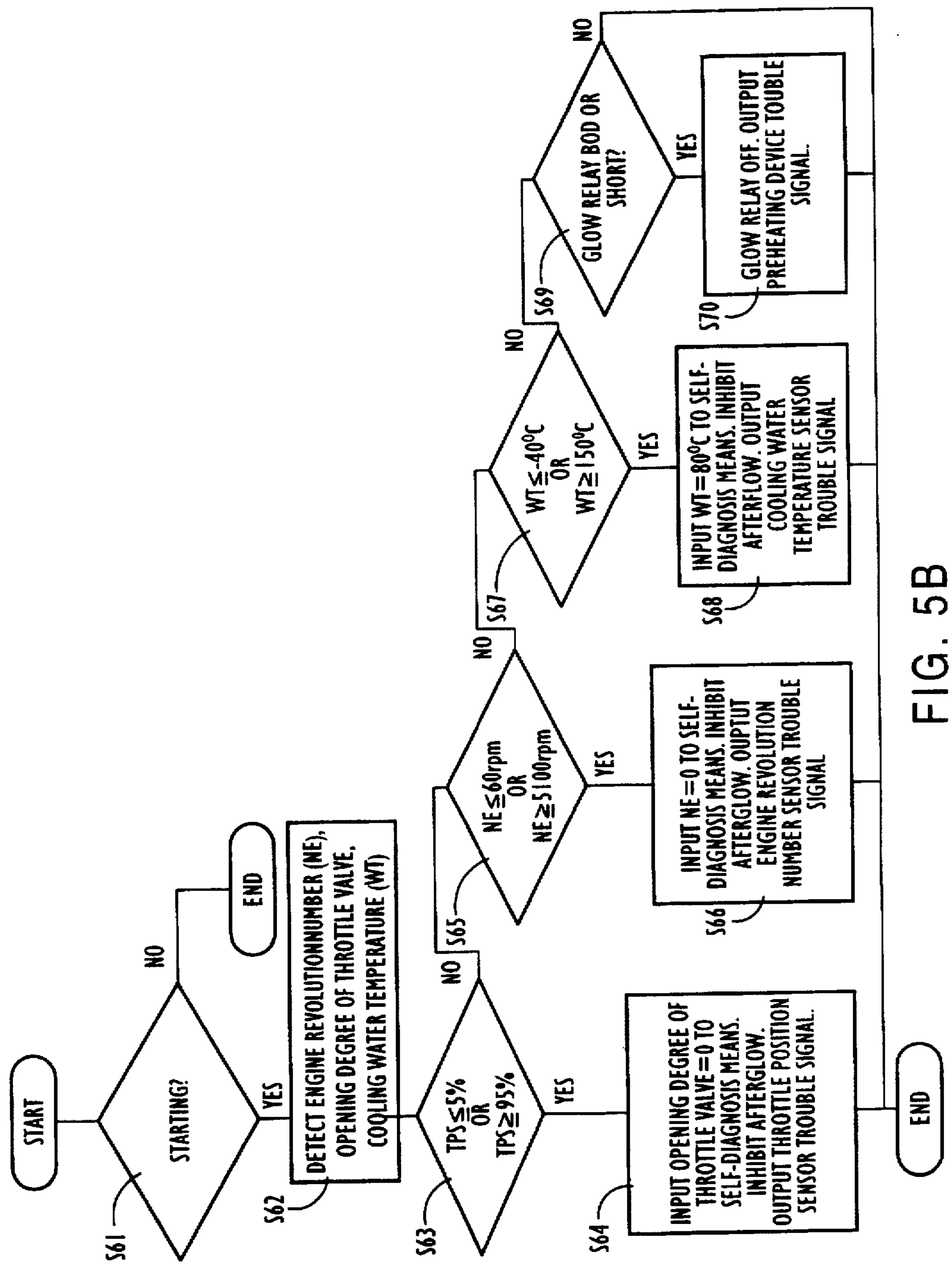
FIG. 5B is a flow chart illustrating a method for controlling the self-diagnosing and fail-safe controller shown in FIG. 5A.
Figure 5C:
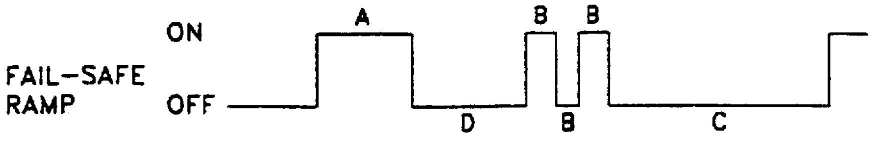
FIG. 5C is a timing diagram of the trouble signal corresponding to the trouble of the throttle valve position sensor.

From now on, the operation of the self-diagnosing/fail-safe controller of the present invention will be described. Referring to FIG. 5b, step S61 determines whether the car with a diesel engine is starting or not. If so, step S62 detects the position of the throttle valve, engine revolution number NE, and cooling water temperature from the throttle valve position sensor, engine revolution detecting sensor, and cooling water temperature sensor, respectively. Then, step S63 determines whether the opening degree of the throttle valve detected from the throttle valve position sensor is below 5% or above 95%. If the opening degree of the throttle valve detected from the throttle valve position sensor is below 5% or above 95%, the opening degree of the throttle valve is input as 0% to the fuel injection time determining means and air conditioner operation determining means, the afterglow is inhibited, and if a trouble is caused in the throttle valve position sensor, a trouble signal corresponding thereto is output in step S64. Here, the timing diagram of the trouble signal corresponding to the trouble of the throttle valve position sensor is shown in FIG. 5C. In case that troubles are caused in the throttle valve, the trouble signal is lighted on for 1.2±0.12 seconds (A), lighted OFF for 1.6±0.16 seconds (D), lighted ON/OFF twice for 0.4±0.004 seconds (B), and lighted OFF for 4.0±0.4 seconds (C) through the output means. This period is repeated to inform the driver of the trouble of the throttle position sensor.

Figure 5D:
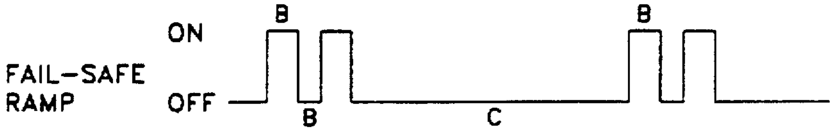
FIG. 5D is a timing diagram of the trouble signal corresponding to the trouble of the engine revolution number sensor.

If the opening degree of the throttle valve is not below 5% or above 95% in step S63, step S65 determines whether the engine revolution number NE detected from the engine revolution sensor is below 60 rpm or above 5,100 rpm. This is performed because the engine is overloaded or in the idling mode if the engine revolution number NE is below 60 rpm or above 5,100 rpm. Then, if the engine revolution number NE detected in step S65 is below 60 rpm or above 5,100 rpm, the detected engine revolution number NE is input as 0 to the fuel injection time determining means and air conditioner determining means, the afterglow is inhibited, and if troubles happen in the engine revolution sensor, a trouble signal corresponding thereto is output in step S66. Here, the timing diagram of the trouble signal corresponding to the trouble of the engine revolution sensor is shown in FIG. 5D. The trouble signal is lighted ON/OFF twice for 0.4±0.004 seconds (B), and lighted OFF for 4.0±0.4 seconds (C) through the output means. This period is repeated to inform the driver of the trouble of the engine revolution number.

Figure 5E:
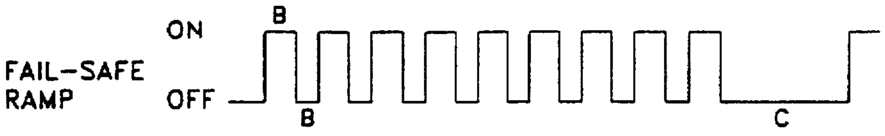
FIG. 5E is a timing diagram of the trouble signal corresponding to the trouble of the cooling water temperature sensor.

If the detected engine revolution number NE is not below 60 rpm or above 5,100 rpm in step S65, step S67 decides whether the temperature of cooling water detected from the cooling water temperature sensor 3 is below −40° C. or above 150° C. If the temperature of cooling water detected from the cooling water temperature sensor 3 is below −40° C. or above 150° C. in step S67, the cooling water temperature WT is input as 80° C. artificially to the fuel injection time determining means and air conditioner determining means of the electronic control unit 9, and the afterglow is inhibited. Sequentially, a trouble signal corresponding to the trouble of the cooling water temperature sensor is output in step S68 via the output means. Here, the timing diagram of the trouble signal corresponding to the trouble of the cooling water temperature sensor is shown in FIG. 5E. The trouble signal is lighted ON/OFF nine times for 0.4±0.004 seconds (B), and lighted OFF for 4.0±0.4 seconds (C) through the output means. This period is repeated to inform the driver of the trouble of the cooling water.

Figure 5F:
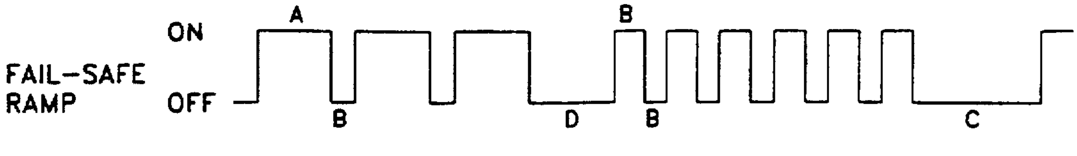
FIG. 5F is a timing diagram of the trouble signal corresponding to the trouble of the glow relay.

If the temperature of cooling water is not below −40° C. or 150° C. in step S67, step S69 determines whether the glow relay 11 is poor or shorted. If so in step S69, the glow relay 11 becomes OFF in step S70 a trouble signal corresponding to the trouble of the glow relay is output in step 70 via the output means. Here, the timing diagram of the trouble signal corresponding to the trouble of the glow relay is shown in FIG. 5F. The trouble signal consists of three times repeated signals which are lighted ON for 1.2±0.12 seconds (A) and OFF for 0.4±0.004 seconds(B), once signal which is lighted off for 1.6±0.16 seconds(D), six times repeated signals are lighted ON/OFF 0.4±0.004 seconds(B), once signal which is lighted OFF for 4.0±0.4 seconds(C) through the output means. The trouble signals are periodically repeated to inform the driver of the trouble of the glow relay and stops the self-diagnosing/fail-safe controller of the present invention. Here, the comparison of this embodiment, specifically, the comparison of the detected opening degree of the throttle valve with a reference value, the comparison of the detected engine revolution number NE, and the comparison of the detected cooling water temperature WT with a reference value, and the judgement of shorting of the glow relay may be performed in different sequences.

As described above, in this embodiment, sensors are provided for the respective portions of the car, if there are caused troubles, the troubles are diagnosed by the trouble determining means of the controller, informed to the driver, and then selfcontrol is performed for the respective portions, minimizing accidents caused due to the car's troubles during its running.

[Embodiment 6]

Figure 6:
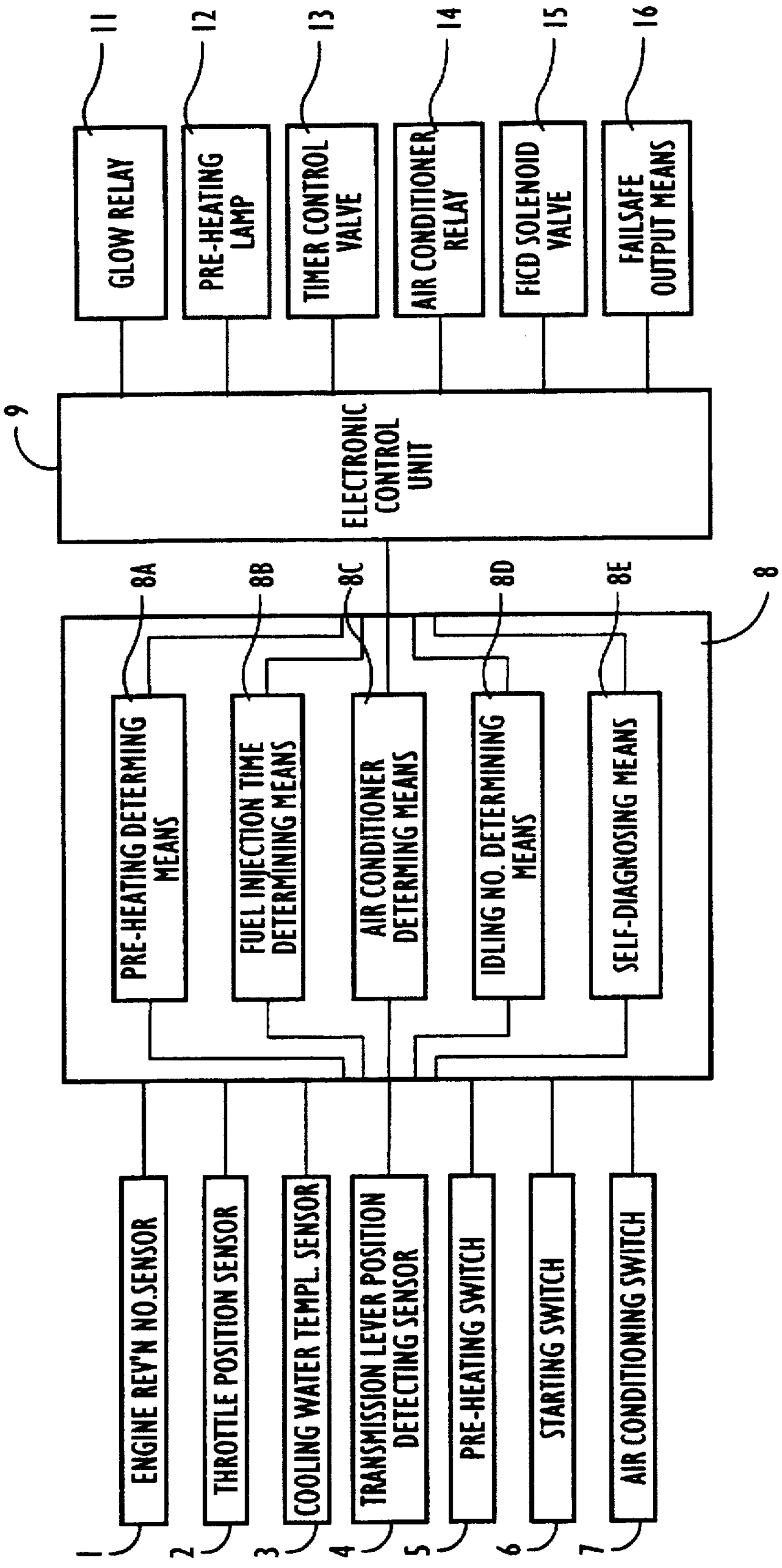
FIG. 6 is a schematic block diagram of a diesel engine controller according to the present invention.

Referring to FIG. 6, a diesel engine controller of the present invention comprises a sensor 1 for detecting the engine revolution number of the car, a sensor for detecting the position of the throttle valve, a sensor 3 for detecting the temperature of cooling water, a transmission lever position detecting sensor 4 for detecting the state of the car's gear, a preheating switch 5 turning ON/OFF according to the operation of the preheating device, and a start switch operating according to whether the car is starting or not.

The engine revolution number NE, the opening degree of the throttle valve, cooling water temperature WT, and the operation of the starting switch detected from engine revolution number sensor 1, throttle position sensor 2, cooling water temperature sensor 3, and starting switch 6, respectively are compared with the average cooling water temperature and engine revolution number when the car is starting, in preheating determining means 8A.

The engine revolution number NE, the opening degree of the throttle valve, and cooling water temperature WT detected from engine revolution number sensor 1, throttle position sensor 2, cooling water temperature sensor 3, respectively, are compared with the optimal engine revolution number, throttle position, and cooling water temperature when fuel is injected, in fuel injection time determining means 8B.

According to the engine revolution number NE, the opening degree of the throttle valve, cooling water temperature WT, and the operation of the starting switch detected from engine revolution number sensor 1, throttle position sensor 2, cooling water temperature sensor 3, and starting switch 6, respectively, air conditioner determining means 8C compares and decides whether the engine is overloaded or not.

The engine revolution number NE and the position of the transmission lever from the engine revolution number sensor 1 and transmission lever position detecting sensor 4 are input to idling number determining means 8D in order to determine whether the engine is in the idling mode, and whether the engine revolution number NE is above a reference value or not in the idling mode.

The engine revolution number NE, the opening degree of the throttle valve, cooling water temperature WT, and the operation of the preheating device detected from engine revolution number sensor 1, throttle position sensor 2, cooling water temperature sensor 3, and preheating switch 6, respectively, are input to self-diagnosing means 8E, and compared with the engine revolution number, the opening degree of the throttle valve, cooling water temperature, and the state of shorting of the preheating device when the respective portions of the car are in their normal states.

Among inputs to electronic control unit 9 are an average cooling water temperature WT and engine revolution number obtained from the preheating determining means 8A during starting, the optimal engine revolution number, opening degree of the throttle value, and cooling water temperature obtained from the fuel injection time determining means 8B, a signal of the air conditioner operation determining means 8C indicative of whether the engine is overloaded or not, a signal of the idling idling determining means 8D indicative of whether the engine revolution number NE is above a reference value or not during idling, and an engine revolution number, the opening degree of the throttle valve, cooling water temperature, and the state of shorting of the preheating device obtained from self-diagnosing means 8E when the respective portions of the car are in their normal states.

According to the input signals of the determining means 8, electronic control unit 9 outputs a control signal to operate glow relay 11, preheating lamp 12, timer control valve 13, air conditioner relay 14, FICD solenoid valve 15, and fail-safe output means 16.

Electronic control unit 9 drives the glow relay 11 and preheating lamp 12 in case that the average cooling water temperature and engine revolution number from preheating determining means 8A during starting are smaller than the detected cooling water temperature WT and engine revolution number NE. If the optimal engine revolution number, throttle position and cooling water temperature WT from fuel injection time determining means 8B during fuel injection are not equal to the detected engine revolution number NE, opening degree of the throttle valve and cooling water temperature, the electronic control unit 9 applies an output signal to timer control valve 13 for controlling the fuel injection pressure, enabling optimal fuel injection.

If the average engine revolution number and the opening degree of the throttle valve from the air conditioner operation determining means 8C when the air conditioner operates do not coincide with the detected engine revolution number and the opening degree of the throttle valve, the electronic control unit 9 applies a control signal to air conditioner relay 14 in order to selectively drive the air conditioner. If the idling number from idling revolution determining means 8D during idling does not coincide with the detected engine revolution number, the electronic control unit 9 drives the FICD solenoid valve 15, increasing or decreasing the opening degree of the throttle valve.

Finally, if the engine revolution number, the opening degree of the throttle valve, and cooling water temperature in normal states are compared in self-diagnosing means 8E, and the respective portions of the car are not in normal states, electronic control unit 9 operates fail-safe output means 16. In order to secure a minimum of running capability, the glow relay 11 is turned OFF, and a predetermined value is input to the respective determining means. (For instance, in case of trouble in the engine revolution number, it is input as 0; in case of trouble in the throttle valve, the opening degree of the throttle valve is input as 0; and in case of trouble in the cooling water temperature, it is input as 80° C.)

As described above, according to data detected from the sensors, the respective determining means of the embodiments of the present invention compare it with set values so that the respective output means are effectively controlled, and thus the performance of control of diesel engine can be improved.

What is claimed is:

1. A diesel engine controller comprising:

an engine revolution number sensor for detecting an engine revolution number of a car;

a throttle position sensor for detecting the position of a throttle valve, and detecting the flow of a mixer;

a cooling water temperature sensor for detecting the temperature of cooling water circulating an engine room in order to prevent the engine from being overheated;

a glow relay operating as a preheating switch operates;

self-diagnosing means for determining whether there is caused a trouble by comparing the detected engine revolution number, the opening degree of the throttle valve and the temperature of cooling water while the glow relay operates, with those when the car is in its normal state;

an electronic control unit for, if there is caused a trouble, outputting an engine revolution number, the opening degree of the throttle valve, and the temperature of cooling water to said selfdiagnosing means, and outputting a control signal; and fail-safe output means operating according to the control signal output from said electronic control unit.

2. A diesel engine controller as claimed in claim 1, wherein said self-diagnosing means comprises:

an engine revolution number trouble determining portion for deciding whether a trouble is caused in the engine revolution number sensor;

a throttle position sensor trouble determining portion for deciding whether a trouble is caused in the throttle position sensor;

a cooling water temperature sensor trouble determining portion for deciding whether a trouble is caused in the cooling water temperature sensor; and a preheating trouble determining portion for deciding whether there is caused a trouble and shorting of the glow relay.

3. A diesel engine controller as claimed in claim 2, wherein said engine revolution number trouble determining portion decides that there is caused a trouble when the engine revolution number is below 60 rpm or above 5,100 rpm.

4. A diesel engine controller as claimed in claim 2, wherein said throttle position sensor trouble determining portion decides that there is caused a trouble when the opening degree of the throttle valve is below 5% or above 95%.

5. A diesel engine controller as claimed in claim 2, wherein said cooling water temperature sensor trouble determining portion decides that there is caused a trouble when the temperature of cooling water is below −40° C. or above 150° C.

6. A diesel engine controller as claimed in claim 2, wherein said preheating trouble determining portion decides that there is caused a trouble when a preheating plus voltage is below 1V while the glow relay operates, and when it is above 4V while the glow relay is in an inoperative condition.

7. A diesel engine controller as claimed in claim 1, wherein said electronic control unit turns off the glow relay when the self-diagnosing means determines a trouble, said unit inputting the engine revolution number a 0 to said self-diagnosing means when there is caused an engine revolution number trouble, said unit inputting the opening degree of the throttle valve as 0% to said self-diagnosing means when there is caused a trouble in the throttle position sensor, said unit inputting the cooling water temperature as 80° C. to said self-diagnosing means when there is caused a trouble in the cooling water temperature sensor.

8. A diesel engine controller as claimed in claim 1, wherein said fail-safe output means is a lamp placed in a meter set.

9. A diesel engine controller as claimed in claim 1, wherein said electronic control unit outputs a control signal to said fail-safe output means so that it is repeatedly lighted ON/OFF for a predetermined time according to an output pulse, when there is a trouble determined by said self-diagnosing means.

10. A diesel engine controller comprising:

an engine revolution number sensor for detecting an engine revolution number of a car;

a throttle position sensor for detecting the position of a throttle valve;

a cooling water temperature sensor for detecting the temperature of cooling water;

a transmission lever position detecting sensor for detecting the state of a gear;

a preheating switch turned ON/OFF as a preheating device operates;

a starting switch turned ON/OFF according to whether the car is in a starting condition;

preheating determining means for determining according to data detected during starting whether the preheating device is driven;

fuel injection time determining means for deciding a fuel injection time according to the detected data;

air conditioner operation determining means for determining whether the engine is overloaded or not according to the data detected when the air conditioner switch operates;

idling number determining means for during engine idling, determine whether the idling number is normal according to the detected data from said transmission lever position detecting sensor;

self-diagnosing means for determining whether a trouble is caused according to the detected data; and an electronic control unit for receiving a signal of said preheating determining portion, a signal of said fuel injection time determining portion, a signal of said air conditioner operation determining portion, a signal of said idling number determining portion, a signal of said self-diagnosing portion, said unit outputting a control signal to a glow relay and preheating lamp when preheating is determined, outputting a control signal to a timer control valve when fuel injection is determined, outputting a control signal to an air conditioner relay when the air conditioner is determined to operate, outputting a control signal to the FICD solenoid valve when idling number is determined, and outputting a control signal to said fail-safe output means when said self-diagnosing means determines that there is caused a trouble.

* * * * *